(12) United States Patent
Tawa

(10) Patent No.: US 11,407,085 B2
(45) Date of Patent: Aug. 9, 2022

(54) METHOD FOR MANUFACTURING GEAR

(71) Applicant: TOYOTA JIDOSHA KABUSHIKI KAISHA, Toyota (JP)

(72) Inventor: Hiroyoshi Tawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 317 days.

(21) Appl. No.: 16/565,658

(22) Filed: Sep. 10, 2019

(65) Prior Publication Data

US 2020/0114491 A1   Apr. 16, 2020

(30) Foreign Application Priority Data

Oct. 12, 2018   (JP) .............................. JP2018-193533

(51) Int. Cl.
| | | |
|---|---|---|
| *B24C 1/10* | (2006.01) | |
| *B21K 1/30* | (2006.01) | |
| *B23P 15/14* | (2006.01) | |
| *C21D 9/32* | (2006.01) | |
| *C21D 7/06* | (2006.01) | |
| *B23F 19/00* | (2006.01) | |

(52) U.S. Cl.
CPC .................. *B24C 1/10* (2013.01); *B21K 1/30* (2013.01); *B23P 15/14* (2013.01); *B23F 19/007* (2013.01); *C21D 7/06* (2013.01); *C21D 9/32* (2013.01); *Y10T 29/477* (2015.01); *Y10T 29/479* (2015.01); *Y10T 29/49467* (2015.01); *Y10T 29/49471* (2015.01)

(58) Field of Classification Search
CPC .. B24C 1/10; B21K 1/30; B21H 5/022; Y10T 29/49467; Y10T 29/49471; Y10T 29/477; Y10T 29/479; Y10T 29/49462; Y10T 29/49464; C21D 7/06; B23P 15/14; B23F 19/007
See application file for complete search history.

(56) References Cited

U.S. PATENT DOCUMENTS

| | | | |
|---|---|---|---|
| 3,580,029 A * | 5/1971 | Daniel ................... | B21H 5/022 72/108 |
| 4,675,488 A * | 6/1987 | Mucha ..................... | C21D 9/32 219/652 |
| 5,911,780 A | 6/1999 | Hamasaka et al. | |

(Continued)

FOREIGN PATENT DOCUMENTS

| | | |
|---|---|---|
| JP | 7-100710 A | 4/1995 |
| JP | 07290363 A * | 11/1995 |

(Continued)

*Primary Examiner* — Sarang Afzali
(74) *Attorney, Agent, or Firm* — Sughrue Mion, PLLC

(57) ABSTRACT

The present disclosure provides a method for manufacturing a gear capable of processing a projection formed on a tooth tip by shot peening while reducing time for manufacturing the gear. A method for manufacturing a gear includes: a process of hardening, by performing shot peening in which shot particles are jetted onto a tooth surface 1a of a gear base material, the tooth surface while applying residual stress to the tooth surface; a process of softening, by at least heating a tooth tip of the gear base material having the hardened tooth surface, the tooth tip; and a process of rotationally driving the gear base material having the softened tooth tip by engaging it with another gear.

3 Claims, 6 Drawing Sheets

(56) References Cited

U.S. PATENT DOCUMENTS

| | | | | |
|---|---|---|---|---|
| 8,430,974 B2* | 4/2013 | Taniguchi | ................ | C21D 1/10 |
| | | | | 148/319 |
| 9,062,364 B2* | 6/2015 | Sano | ........................ | C21D 7/06 |
| 9,539,675 B2* | 1/2017 | Inagaki | .................... | C21D 7/06 |
| 10,378,612 B2* | 8/2019 | Zhao | ........................ | B24C 1/10 |

FOREIGN PATENT DOCUMENTS

| JP | 9-85624 A | 3/1997 |
|---|---|---|
| JP | 11-156721 A | 6/1999 |
| JP | 2013-213260 A | 10/2013 |

\* cited by examiner

METHOD FOR MANUFACTURING GEAR

CROSS REFERENCE TO RELATED APPLICATIONS

This application is based upon and claims the benefit of priority from Japanese patent application No. 2018-193533, filed on Oct. 12, 2018, the disclosure of which is incorporated herein in its entirety by reference.

BACKGROUND

The present disclosure relates to a method for manufacturing a gear.

In a general method for manufacturing a gear, shot peening is performed on a tooth base surface of a gear base material to harden the tooth base surface while residual stress is applied thereto. For example, in the shot peening method of the gear disclosed in Japanese Unexamined Patent Application Publication No. H9-85624, a preliminary shot peening is performed on only a tooth tip of a gear base material, then a main shot peening is performed on a tooth base surface of the gear base material and the whole gear base material is hardened while residual stress is applied thereto.

Specifically, a first preliminary shot peening is performed on a side of one involute surface in the tooth tip of the gear base material and then a second preliminary shot peening is performed on a side of the other involute surface in the tooth tip of the gear base material. Then, a main shot peening is performed aiming at the tooth base from a direction substantially perpendicular to the tooth base of the gear base material. In this way, the shot peening method of the gear disclosed in Japanese Unexamined Patent Application Publication No. H9-85624 prevents forming of a projection on the tooth tip by shot peening.

SUMMARY

The applicant has found the following problem. In the shot peening method disclosed in Japanese Unexamined Patent Application Publication No. H9-85624, a preliminary shot peening using shot particles having a relatively low hardness can prevent a projection deformed due to shot peening from forming in a tooth tip when a main shot peening is performed. However, at least three shots are required to harden a tooth surface of the gear base material. This causes a problem that it takes a long time for shot peening processing to be completed and thus the time for manufacturing a gear becomes long.

The present disclosure has been made in view of the above problem and an object thereof is to provide a method for manufacturing a gear capable of easily processing a projection formed on a tooth tip even if shot peening is performed using shot particles having a relatively high hardness in the event of hardening a tooth surface of the gear, thereby shortening the time for manufacturing the gear by reducing types of short peening to be performed.

A first exemplary aspect is a method for manufacturing a gear, the method including:

a process of hardening, by performing shot peening in which shot particles are jetted onto a tooth surface of a gear base material, the tooth surface while applying residual stress to the tooth surface;

a process of softening, by at least heating a tooth tip of the gear base material having the hardened tooth surface, the tooth tip; and a process of rotationally driving the gear base material having the softened tooth tip by engaging it with another gear and pressing a projection formed on the tooth tip by the shot peening against a tooth surface of the other gear to deform the projection so that it conforms to the tooth surface of the other gear.

This eliminates, unlike the shot peening method disclosed in Japanese Unexamined Patent Application Publication No. H9-85624, the need for performing a preliminary shot peening on a gear base material. It is thus possible to easily process a projection formed on a tooth tip of the raw gear material even if shot peening is performed using shot particles having a relatively high hardness, thereby shortening the time for manufacturing the gear by reducing types of short peening to be performed.

It is preferred in the above-described method for manufacturing a gear that a gear base material having the softened tooth tip be incorporated into a gear train of a drive device and the gear base material having the softened tooth tip be rotationally driven by engaging it with another gear of the drive device, then a projection formed on the tooth tip by the shot peening be pressed against a tooth surface of the other gear to deform the projection so that it conforms to the tooth surface of the other gear.

By doing so, a projection on a gear base material is deformed so as to conform to a tooth surface of another gear and it is thus possible to prevent trochoid interference between the gear base material and the other gear. Further, it is possible to absorb assembly errors and processing errors of the gear of the drive device. Therefore, highly accurate assembly and processing of the gear are not required when the drive device is manufactured and it is thus possible to simplify the manufacturing of the drive device.

In the above-described method for manufacturing a gear, it is preferred in the process of softening the tooth tip that a projection formed on the tooth tip of the gear base material by the shot peening be heated using a high frequency induction heating apparatus.

This makes it possible to locally heat and soften the projection of the gear base material. Therefore, it is possible to prevent hardness of other parts of the gear base material from decreasing.

The present disclosure can provide a method for manufacturing a gear capable of easily processing a projection formed on a tooth tip even if shot peening is performed using shot particles having a relatively high hardness in the event of hardening a tooth surface of the gear, thereby shortening the time for manufacturing the gear by reducing types of short peening to be performed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific embodiment to which the present disclosure is applied is explained hereinafter in detail with reference to the drawings. However, the present disclosure is not limited to the embodiment shown below. Further, for the clarification of the explanation, the following descriptions and the drawings are simplified as appropriate.

Figure 1:
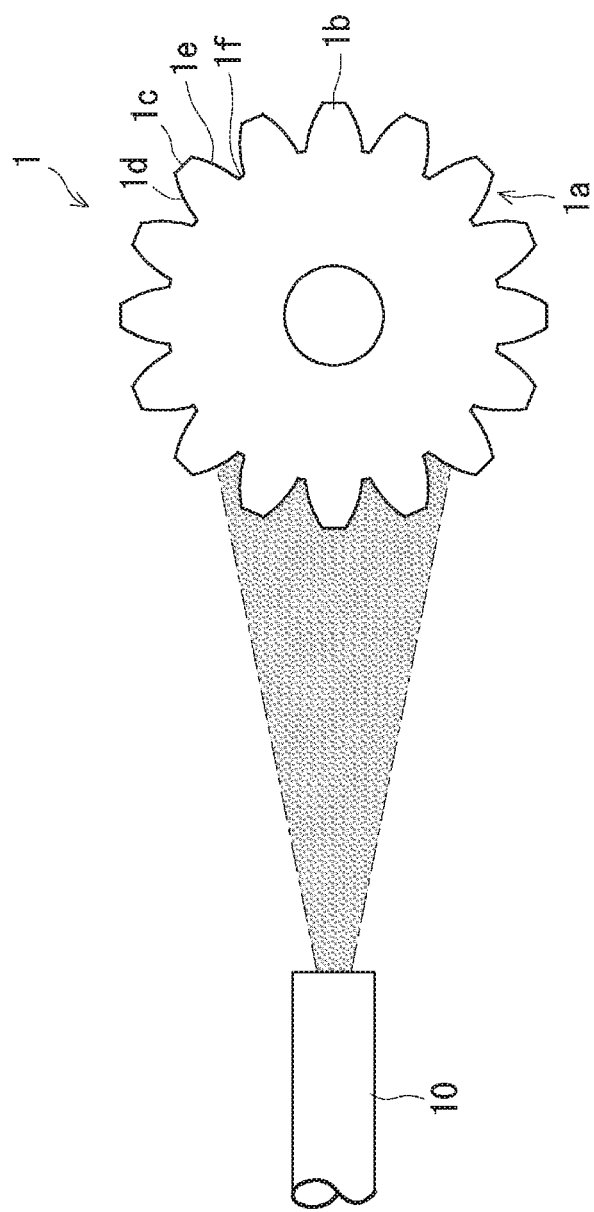
FIG. 1 is a plan view schematically showing a state in which shot peening is performed on a tooth surface of a gear base material in a method for manufacturing a gear according to an embodiment.
Figure 2:
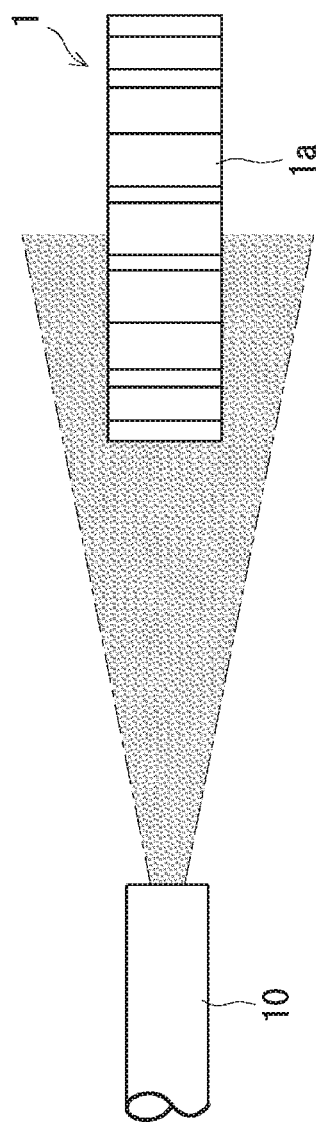
FIG. 2 is a side view schematically showing a state in which shot peening is performed on the tooth surface of the gear base material in the method for manufacturing a gear according to the embodiment.

FIG. 1 is a plan view schematically showing a state in which shot peening is performed on a tooth surface of a gear base material in the method for manufacturing a gear according to this embodiment. FIG. 2 is a side view schematically showing a state in which shot peening is performed on the tooth surface of the gear base material in the method for manufacturing a gear according to this embodiment. Note that FIGS. 1 and 2 indicate the shot peening by hatching.

First, as shown in FIGS. 1 and 2, shot peening in which shot particles are jetted by air onto a tooth surface $1a$ of a gear base material $1$ is performed by using an air nozzle $10$. The gear base material $1$ is, for example, a spur gear in which a plurality of teeth $1b$ are arranged at a predetermined pitch in a circumferential direction of the gear base material $1$. Note that the gear base material $1$ may be a helical gear.

A tooth $1b$ includes a tooth tip surface $1c$, a first involute surface $1d$ disposed on one side of the tooth $1b$ with the tooth tip surface $1c$ interposed therebetween, and a second involute surface $1e$ disposed on the other side of the tooth $1b$ with the tooth tip surface $1c$ interposed therebetween. Further, a tooth bottom surface if is disposed between the first involute surface $1d$ of the tooth $1b$ and the second involute surface $1e$ of the adjacent tooth $1b$. That is, the tooth surface $1a$ includes the first involute surface $1d$, the tooth tip surface $1c$, the second involute surface $1e$, and the tooth bottom surface $1f$ according to the number of teeth.

The gear base material $1$ is manufactured, for example, by forging. However, the gear base material $1$ may be manufactured by sintering or the like, and a method for manufacturing the gear base material $1$ is not limited.

Shot peening is performed on the entire area of at least the tooth surface $1a$ of the gear base material $1$. By doing so, the tooth surface $1a$ of the gear base material $1$ is hardened while residual stress (e.g., about $-1,000$ MPa to $-1,500$ MPa) is applied thereto. At this time, in order to increase the strength of the tooth surface $1a$ of the gear base material $1$, hardness of the shot particles is preferably higher than that in a general shot peening, for example, about 800 HV.

Figure 3:
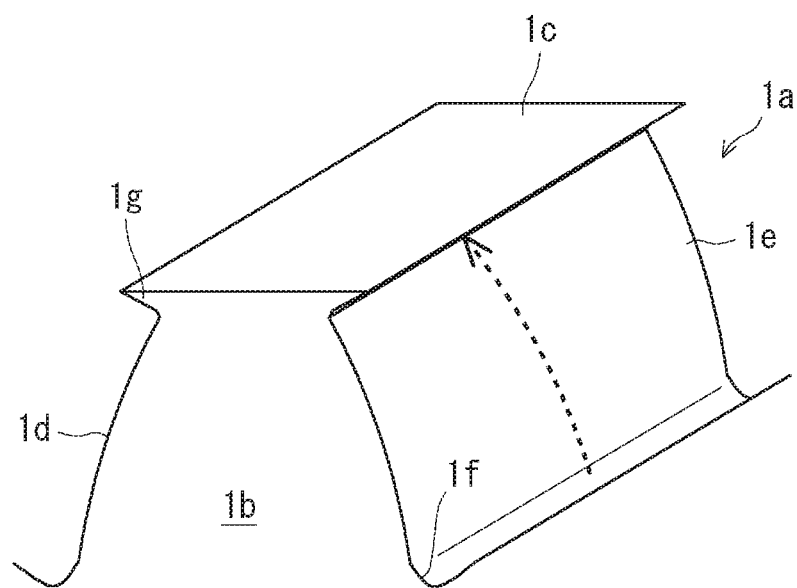
FIG. 3 is a perspective view schematically showing a tooth of the gear base material in which shot peening has been performed on the entire tooth surface of the gear base material in the method for manufacturing a gear according to the embodiment.
Figure 4:
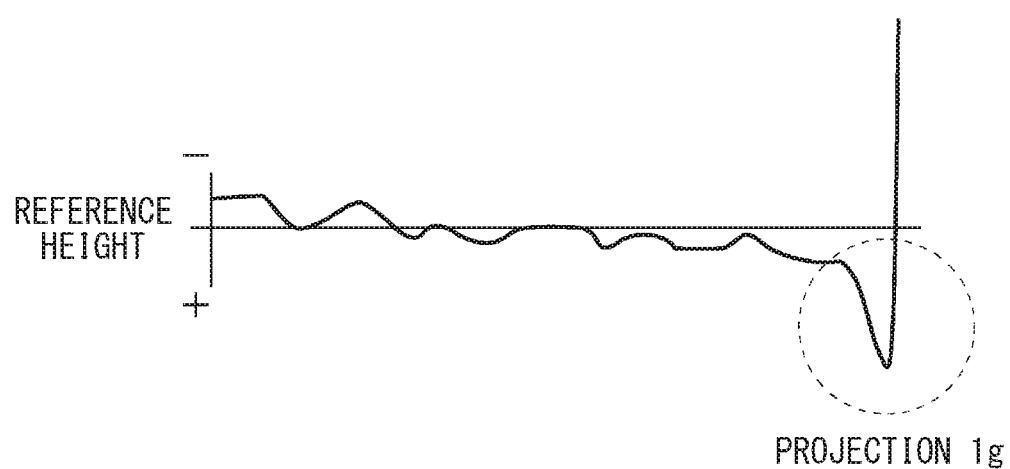
FIG. 4 is a diagram showing a surface shape in which a second involute surface from a bottom surface to a tip surface of the tooth shown in FIG. 3 has been measured in accordance with a direction indicated by a broken-line arrow.

FIG. 3 is a perspective view schematically showing a tooth of the gear base material in which shot peening has been performed on the entire tooth surface in the method for manufacturing a gear according to this embodiment. FIG. 4 is a diagram showing a surface shape in which a second involute surface from a bottom surface to a tip surface of the tooth shown in FIG. 3 has been measured in accordance with a direction indicated by a broken-line arrow. Note that in FIG. 4, a "+" side with respect to a reference height is the side that is projected with respect to the reference height, and a "−" side with respect to a reference height is the side that is recessed with respect to the reference height.

When shot peening is performed on the entire tooth surface $1a$ of the gear base material $1$, a projection $1g$ is formed on the tooth tip of the gear base material $1$ as shown in FIGS. 3 and 4. A height of the projection $1g$ is, for example, about 10 μm.

Figure 5:
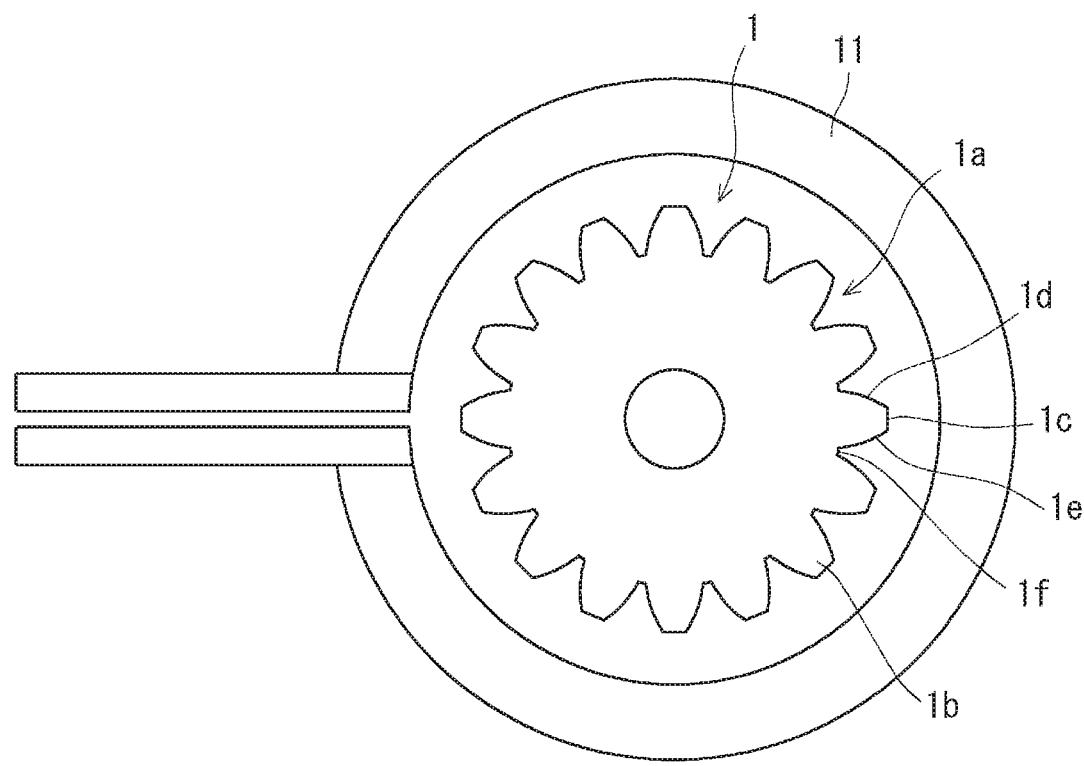
FIG. 5 is a plan view schematically showing a state in which a tooth tip of the gear base material is heated in the method for manufacturing a gear according to the embodiment.
Figure 6:
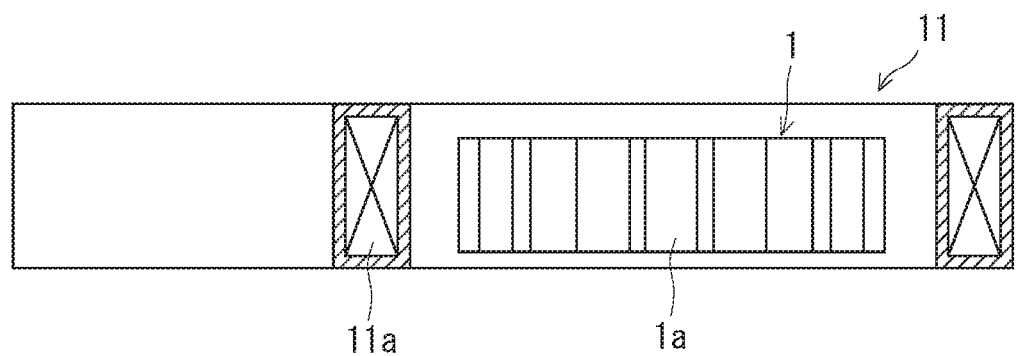
FIG. 6 is a partial cross-sectional view schematically showing a state in which the tooth tip of the gear base material is heated in the method for manufacturing a gear according to the embodiment.

Next, the tooth tip of the gear base material $1$ of which the tooth surface $1a$ is hardened is heated. FIG. 5 is a plan view schematically showing a state in which a tooth tip of the gear base material is heated in the method for manufacturing a gear according to this embodiment. FIG. 6 is a partial cross-sectional view schematically showing a state in which the tooth tip of the gear base material is heated in the method for manufacturing a gear according to this embodiment.

Specifically, for example, a high frequency induction heating apparatus $11$ is used to heat the tooth tip of the gear base material $1$. That is, as shown in FIGS. 5 and 6, by supplying an alternating current to an induction coil $11a$ of the high frequency induction heating apparatus $11$ that is disposed so as to surround the tooth surface $1a$ of the gear base material $1$, an induced current is supplied to the gear base material $1$ to inductively heat the tooth tip thereof.

At this time, the induced current is concentrated on the projection $1g$ of the tooth tip of the gear base material $1$ and hence the projection $1g$ is locally overheated by the so-called edge effect. This makes it possible to locally soften the projection $1g$ of the gear base material $1$.

Note that an alternating current value to be supplied to the induction coil $11a$ of the high frequency induction heating apparatus $11$, a time for causing the alternating current to flow to the induction coil, or a frequency of the alternating current may be controlled so that the projection $1g$ of the gear base material $1$ is overheated and softened to have hardness which is below the predetermined hardness.

For example, when the hardness around the projection $1g$ before heating is 770 HV 0.03, an alternating current value to be supplied to the induction coil $11a$ of the high frequency induction heating apparatus $11$, a time for causing the alternating current to flow to the induction coil, or a frequency of the alternating current are controlled so that the projection 1g is softened to have hardness around it of about 410 HV 0.03 by heating.

Figure 7:
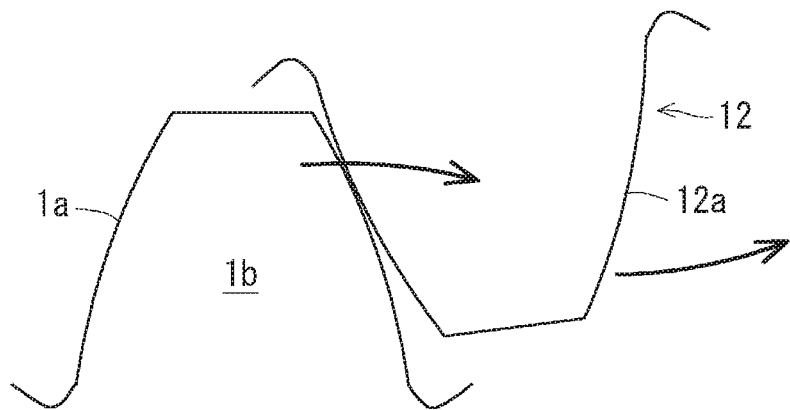
FIG. 7 is a plan view schematically showing a state in which the gear base material is rotationally driven by engaging it with another gear in the method for manufacturing a gear according to the embodiment.
Figure 8:
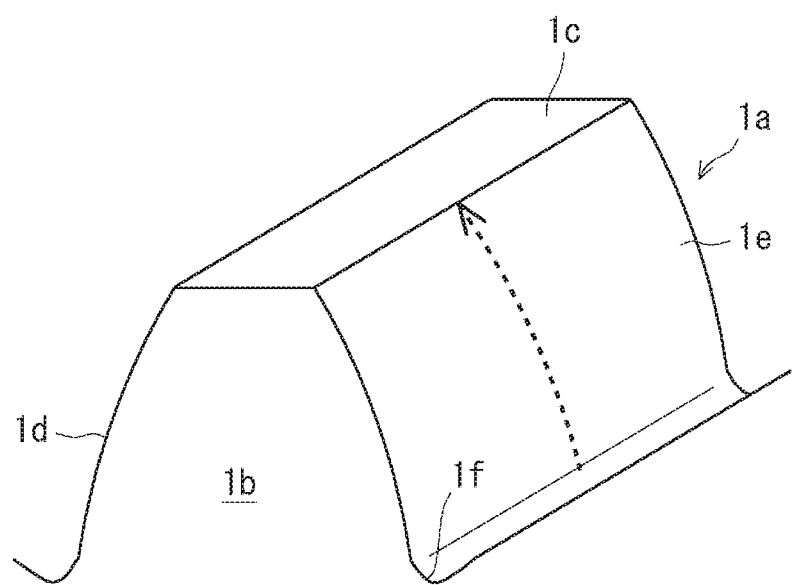
FIG. 8 is a perspective view schematically showing a tooth in which a projection of the gear base material is deformed so as to conform to the other gear in the method for manufacturing a gear according to the embodiment.
Figure 9:
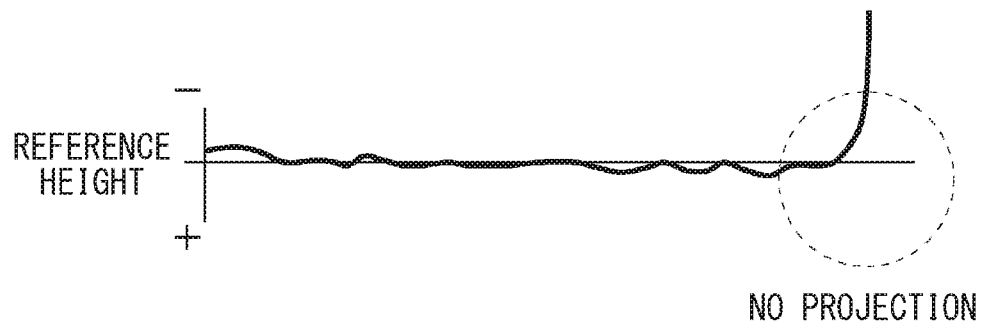
FIG. 9 is a diagram showing a surface shape in which a second involute surface from a bottom surface to a tip surface of the tooth shown in FIG. 8 has been measured in accordance with a direction indicated by a broken-line arrow.

Next, the gear base material 1 of which the projection 1g is softened is rotationally driven by engaging it with another gear. FIG. 7 is a plan view schematically showing a state in which the gear base material is rotationally driven by engaging it with the other gear in the method for manufacturing a gear according to this embodiment. FIG. 8 is a perspective view schematically showing a tooth in which the projection on the gear base material is deformed so as to conform to the other gear in the method for manufacturing a gear according to this embodiment. FIG. 9 is a diagram showing a surface shape in which a second involute surface from a bottom surface to a tip surface of the tooth shown in FIG. 8 has been measured in accordance with a direction indicated by a broken-line arrow. Note that in FIG. 9, a "+" side with respect to a reference height is the side that is projected with respect to the reference height, and a "−" side with respect to a reference height is the side that is recessed with respect to the reference height.

Specifically, for example, the gear base material 1 is actually incorporated into a gear train of a drive device such as a transmission and then the gear base material 1 is rotationally driven by engaging it with another gear 12 of the drive device as shown in FIG. 7. However, the drive device is not limited to a transmission, and may be any device capable of transmitting driving power by a gear train.

As described above, since the projection 1g of the gear base material 1 is softened, the gear base material 1 is rotationally driven and the projection 1g thereof is pressed against a tooth surface 12a of the other gear 12, then the projection 1g is deformed so as to conform to the tooth surface 12a of that other gear 12. That is, the projection 1g of the gear base material 1 is pressed against the tooth 1b of the gear base material 1 by the tooth surface 12a of the other gear 12 and the tooth surface 1a of the gear base material 1 is leveled as shown in FIG. 8. This makes it possible to process the projection 1g of the gear base material 1 so that it almost disappears as shown in FIG. 9.

Accordingly, the above-described "predetermined hardness" may be hardness capable of deforming the projection 1g of the gear base material 1 so that it conforms to the tooth surface 12a of the other gear 12, and may be set in accordance with, for example, hardness of the gear base material 1 and the other gear 12 as appropriate.

Note that the projection 1g of the gear base material 1 is deformed so as to conform to the tooth surface 12a of the other gear 12 and it is thus possible to prevent trochoid interference between the gear base material 1 and the other gear 12. Further, it is possible to absorb assembly errors and processing errors of the gear of the drive device. Therefore, high accurate assembly and processing of the gear are not required when the drive device is manufactured, and it is thus possible to simplify the manufacturing of the drive device.

As described above, the method for manufacturing a gear according to this embodiment heats a tooth tip of the gear base material 1, then rotationally drives the gear base material 1 by engaging it with the other gear 12, and deforms the projection 1g of the gear base material 1 so that it conforms to the tooth surface 12a of the other gear 12. This eliminates, unlike the shot peening method disclosed in Japanese Unexamined Patent Application Publication No. H9-85624, the need for performing a preliminary shot peening on a gear base material. It is thus possible to easily process a projection 1g of the gear base material 1 even if shot peening is performed using shot particles having a relatively high hardness, thereby shortening the time for manufacturing the gear by reducing types of short peening to be performed.

Figure 10:
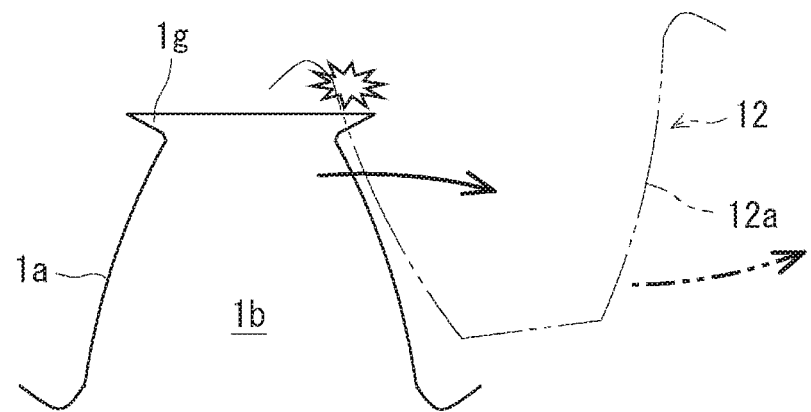
FIG. 10 is a diagram schematically showing a state in which a projection of the gear base material damages a tooth surface of the other gear.

Further, the method for manufacturing a gear according to this embodiment softens the projection 1g of the gear base material 1 and engages the softened projection 1 with the other gear 12 so that the tooth surface 12a of the other gear 12 can be prevented from being damaged due to the projection 1g of the gear base material 1 as shown in FIG. 10. Note that FIG. 10 indicates the other gear 12 by a dot-dot-dash line.

Further, the method for manufacturing a gear uses the high frequency induction heating apparatus 11 to heat the tooth tip of the gear base material 1 and thus can locally heat and soften the projection 1g of the gear base material 1. Therefore, it is possible to prevent hardness of other parts of the gear base material 1 from decreasing.

The present disclosure is not limited to the above-described embodiment, and various modifications can be made without departing from the scope of the disclosure.

For example, in the above-described embodiment, the high frequency induction heating apparatus 11 is used to heat the tooth tip of the gear base material 1, but a laser heater to which a robot arm is attached may be used instead to heat the same. That is, any apparatus capable of locally heating the periphery including the projection 1g of the gear base material 1 as the tooth tip of that gear base material 1 may be used.

For example, in the above-described embodiment, the gear base material 1 is incorporated into a gear train of the drive device and is rotationally driven by engaging it with the other gear 12, but the other gear engaged with the gear base material is not limited. That is, it is only required that the projection 1g of the gear base material 1 can be leveled to conform to the tooth surface 1a.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a gear, the method comprising:
   a process of hardening, by performing shot peening in which shot particles are jetted onto a tooth surface of a gear base material, the tooth surface while applying residual stress to the tooth surface;
   a process of softening, by at least heating a tooth tip of the gear base material having the hardened tooth surface, the tooth tip; and
   a process of rotationally driving the gear base material having the softened tooth tip by engaging the gear base material having the softened tooth tip with another gear and pressing a projection formed on the tooth tip by the shot peening against a tooth surface of the other gear to deform the projection so that the projection conforms to the tooth surface of the other gear.

2. The method for manufacturing a gear according to claim 1, wherein the gear base material having the softened tooth tip is incorporated into a gear train of a drive device and the gear base material having the softened tooth tip is rotationally driven by engaging the gear base material having the softened tooth tip with another gear in the gear train of the drive device, then a projection formed on the tooth tip by the shot peening is pressed against a tooth surface of the other gear to deform the projection so that the projection conforms to the tooth surface of the other gear.

3. The method for manufacturing a gear according to claim 1, wherein in the process of softening the tooth tip, the projection formed on the tooth tip of the gear base material by the shot peening is heated using a high frequency induction heating apparatus.

\* \* \* \* \*